(12) United States Patent
McAllister

(10) Patent No.: US 12,435,848 B2
(45) Date of Patent: Oct. 7, 2025

(54) KAYAK ILLUMINATION DEVICES

(71) Applicant: Brightz, Ltd., Ottawa Lake, MI (US)

(72) Inventor: James McAllister, Perrysburg, OH (US)

(73) Assignee: BRIGHTZ, LTD., Ottawa Lake, MI (US)

( * ) Notice: Subject to any disclaimer, the term of this patent is extended or adjusted under 35 U.S.C. 154(b) by 0 days.

(21) Appl. No.: 18/226,041

(22) Filed: Jul. 25, 2023

(65) Prior Publication Data
US 2024/0027043 A1    Jan. 25, 2024

Related U.S. Application Data

(60) Provisional application No. 63/391,976, filed on Jul. 25, 2022.

(51) Int. Cl.
| | |
|---|---|
| *F21S 41/19* | (2018.01) |
| *F21S 4/26* | (2016.01) |
| *F21V 19/00* | (2006.01) |
| *F21V 23/00* | (2015.01) |
| *F21V 31/00* | (2006.01) |
| *F21W 107/20* | (2018.01) |
| *F21Y 103/10* | (2016.01) |
| *F21Y 115/10* | (2016.01) |

(52) U.S. Cl.
CPC ............. *F21S 41/192* (2018.01); *F21S 4/26* (2016.01); *F21V 19/005* (2013.01); *F21V 19/0055* (2013.01); *F21V 23/008* (2013.01); *F21V 31/005* (2013.01); *F21V 2200/15* (2015.01); *F21W 2107/20* (2018.01); *F21Y 2103/10* (2016.08); *F21Y 2115/10* (2016.08)

(58) Field of Classification Search
CPC ........... F21S 4/26; F21S 4/24; F21V 19/0055; B63B 45/04
See application file for complete search history.

(56) References Cited

U.S. PATENT DOCUMENTS

| | | | |
|---|---|---|---|
| 7,051,464 B2 * | 5/2006 | Kwon .................... | B63B 45/04 40/550 |
| 9,366,404 B1 | 6/2016 | Porter et al. | |
| 2004/0012979 A1 * | 1/2004 | Squicciarini ........... | G02B 6/001 362/555 |
| 2004/0179358 A1 * | 9/2004 | Tufte ....................... | F21S 4/20 362/223 |

(Continued)

*Primary Examiner* — Eric T Eide
(74) *Attorney, Agent, or Firm* — Vorys, Sater, Seymour and Pease LLP; Rex W. Miller, II

(57) ABSTRACT

An illumination device includes one or more illumination sources each comprising a length of material and one or more lights configured to illuminated the length of the material, one or more mounting brackets configured to receive a portion of the length of the one or more illumination sources and couple the received portion of the one or more illumination sources to a surface of an object, a control module comprising a power source and an electrical circuit, wherein the electrical circuit is configured to electrically couple the power source to the one or more illumination sources based on operation of a switch in the electrical circuit, and a control module mounting bracket configured to selectively secure the control module to the surface of the object.

3 Claims, 15 Drawing Sheets

(56) References Cited

U.S. PATENT DOCUMENTS

| | | | |
|---|---|---|---|
| 2005/0092517 A1* | 5/2005 | Fan | F21S 4/24 174/117 FF |
| 2010/0118557 A1* | 5/2010 | Ortwein | B63B 45/02 362/477 |
| 2012/0032587 A1* | 2/2012 | Shih | F21S 4/26 315/32 |
| 2015/0217840 A1* | 8/2015 | Taylor | B63B 59/02 156/108 |
| 2015/0364851 A1* | 12/2015 | Levante | F21V 23/001 362/640 |
| 2016/0120008 A1* | 4/2016 | Sutherland | H05B 47/12 340/815.46 |
| 2017/0114988 A1* | 4/2017 | Andretta-Pulera | F21S 4/26 |
| 2020/0032972 A1* | 1/2020 | Wells | F21V 31/005 |

\* cited by examiner

KAYAK ILLUMINATION DEVICES

CROSS-REFERENCE TO RELATED APPLICATION

This application claims priority to U.S. Provisional Application No. 63/391,976 filed Jul. 25, 2022, the disclosure of which is incorporated herein by reference in its entirety.

TECHNICAL FIELD

The present specification relates to illumination devices, and more specifically to systems and methods of providing illumination for watercraft such as a kayak.

BACKGROUND

Illumination devices are commonly used for outdoor activities to illuminate the outdoor environment and be seen in the dark.

SUMMARY

In one embodiment, an illumination device includes one or more illumination sources each comprising a length of material and one or more lights configured to illuminated the length of the material, one or more mounting brackets configured to receive a portion of the length of the one or more illumination sources and couple the received portion of the one or more illumination sources to a surface of an object, a control module comprising a power source and an electrical circuit, wherein the electrical circuit is configured to electrically couple the power source to the one or more illumination sources based on operation of a switch in the electrical circuit, and a control module mounting bracket configured to selectively secure the control module to the surface of the object.

In another embodiment, a method for illuminating an object with an illumination device comprising a first illumination source comprising a length of material and one or more lights configured to illuminated the length of the material, one or more mounting brackets, a control module comprising a power source and an electrical circuit, wherein the electrical circuit is configured to electrically couple the power source to the one or more illumination sources based on operation of a switch in the electrical circuit, and a control module mounting bracket, the method comprising: coupling the control module mounting bracket to a surface of the object, attaching the control module to the control module mounting bracket, coupling the first illumination source, about a portion of the length where a first wire from the control module connects to the first illumination source, to the surface of the object with an initiating bracket of the one or more mounting brackets, and coupling a first end of the length of the first illumination source to the surface of the object with a terminal bracket of the one or more mounting brackets.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to illumination devices. The illumination device includes a rope light, power source, and mounting brackets capable of being connected to the hull of a boat such as a kayak. Embodiments described herein are described with reference to a kayak; however, the illumination devices may be connected to other objects such as canoes, fishing boats, golf carts, all-terrain vehicles (ATVs), and the like. The following will now describe embodiments of the illumination devices in detail with reference to the figures.

Figure 1:
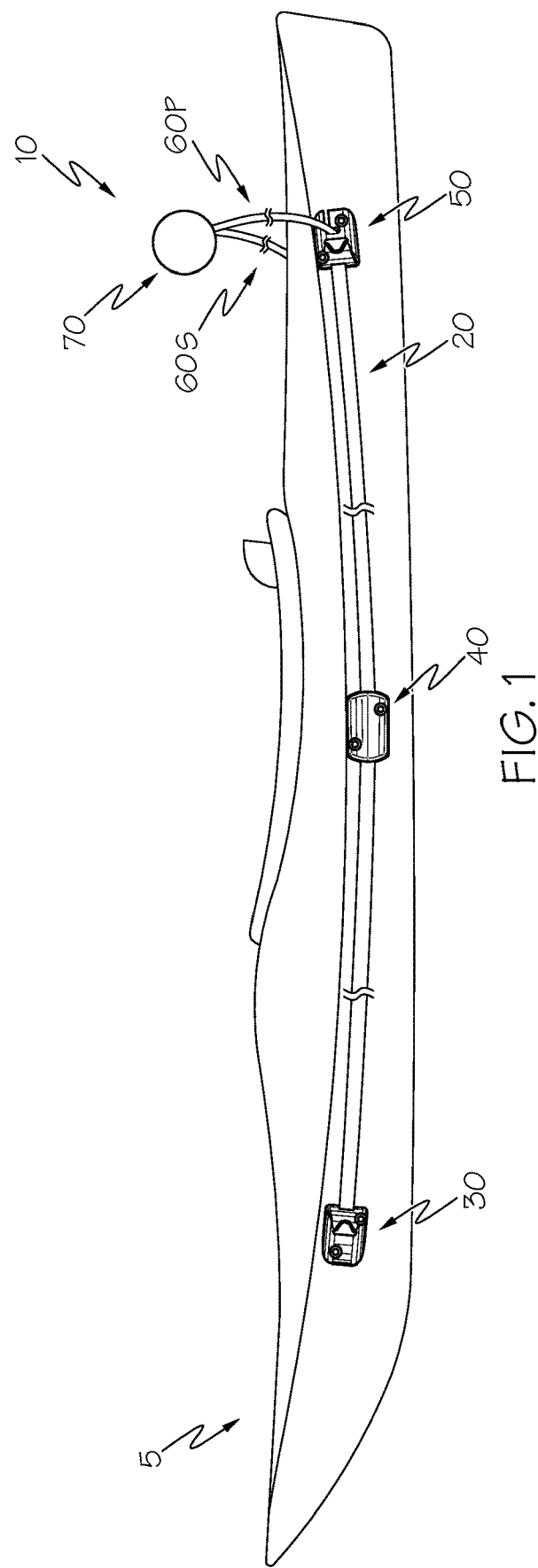
FIG. 1 depicts a kayak having an illumination device, according to one or more embodiments shown and described herein.

FIG. 1 depicts a kayak 5 having an illumination device 10 according to embodiments of the present disclosure connected thereto. The illumination device 10 is configured to provide illumination along the length of the boat, for example. FIG. 1 depicts a side view of the kayak 5, but it is understood that the same configuration may be applied to the opposite side of the kayak that is not shown in FIG. 1. To accomplish this configuration, an illumination source 20 such as an LED rope light, an illuminating optical fiber, LED strip lights, rope LEDs, optical fiber LEDs, light-diffusing fiber (e.g., Fibrance®), or a combination of other light sources is utilized. The one or more illumination sources 20 may include a plurality of lights 22 encased in a PVC jacket or other material. The one or more illumination sources 20 may be encapsulated within a transparent or semi-transparent, watertight tube. For example, a silicone encapsulation or other material that is waterproof and transparent or semi-transparent may be used to enclose the one or more illumination sources. The one or more illumination sources 20 may have an IP65 rating. In some embodiments, the illumination source may include about 16 RGB LEDs per meter.

The length of the illumination source 20 is coupled to the hull of the kayak 5 through mounting brackets 30, 40 and 50. The mount brackets include one or more mounting brackets 30, 40, 50 used to connect a first end, a middle portion (for long illumination sources), and a second end, opposite the first end, of the illumination source 20 to the hull of the kayak 5. The mounting brackets 30, 40, 50 will be described in more detail herein.

In some embodiments, the one or more illumination sources 20 are first attached to the hull of the kayak 5 with an adhesive such as a tape or glue. Mounting brackets 30, 40, 50 may then be attached via one or more fasteners or additional adhesive. In embodiments where one or more fasteners are used to attach the mounting brackets 30, 40, 50 In some embodiments, the mounting brackets 30, 40, 50 may be attached to the surface of an object by magnets. For example, a first magnet may be coupled to the mounting bracket with adhesive such as glue or tape. A second magnet may be configured on the surface opposite the mounting bracket, thereby magnetically coupling the mounting bracket to the surface of the object. In some instances, the mounting brackets 30, 40, 50 may comprise a material that can be magnetized such as a ferromagnetic material or ferromagnetic material. As such, the mounting brackets 30, 40, 50 may be attachable to the surface of the object with the use of an opposing magnet positioned on the opposite side of the surface of the object as the mounting brackets 30, 40, 50.

In some embodiments, the illumination source 20 may include a magnet tape or ferromagnetic material positioned along the length of the one or more illumination sources 20 or at predefined intervals along the length of the one or more illumination sources 20. An corresponding magnet may then be used to selectively and magnetically couple the illumination source 20 to the surface of the object. In this way, the one or more illumination sources 20 may be attached when in use and removed after use to prevent damage during transport or storage. For example, a removable illumination device 10 solve issues related to interference with tow straps and other transportation or storage devices from damaging the illumination device 10. The selective attachment may also enable a user to move the illumination device from object to object.

The aforementioned embodiments for attaching the mounting brackets 30, 40, 50 and the one or more illumination sources 20 may be applied to the control module mounting bracket 77 for coupling the mounting bracket 70 to the object.

In further embodiments, the mounting brackets 30, 40, 50 may comprise a two or more part assembly. For example, a first part may be attached to the surface of the object and include one or more selective coupling mechanisms configured to receive and connect a second part of the mounting bracket. The second part of the mounting bracket may be one or more of the mounting brackets 30, 40, 50 that are structurally configured to receive and retain portions of the one or more illumination sources 20. For example, the first part and the second part may be selectively coupled with snap features, interference fitting features, or the like.

The second end of the illumination sources is connected to a control module 70 via wires 60P (for the port side illumination source 20) and wires 60S (for the starboard side illumination source 20). The control module 70 includes a power source, electronic circuitry for controlling the illumination sources 20 and a switch.

Figure 2:
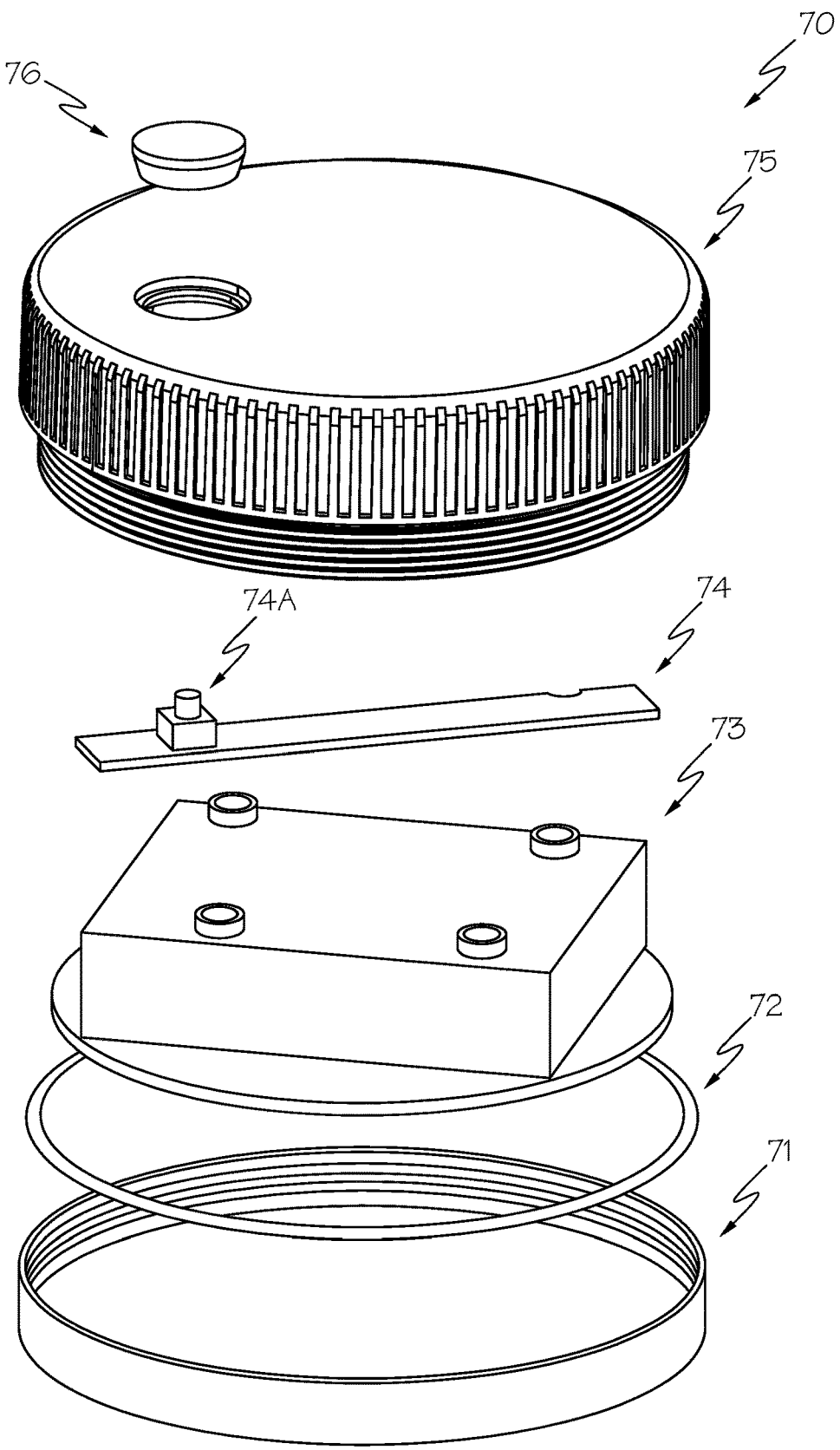
FIG. 2 depicts an exploded view of an example control module, according to one or more embodiments shown and described herein.
Figure 3:
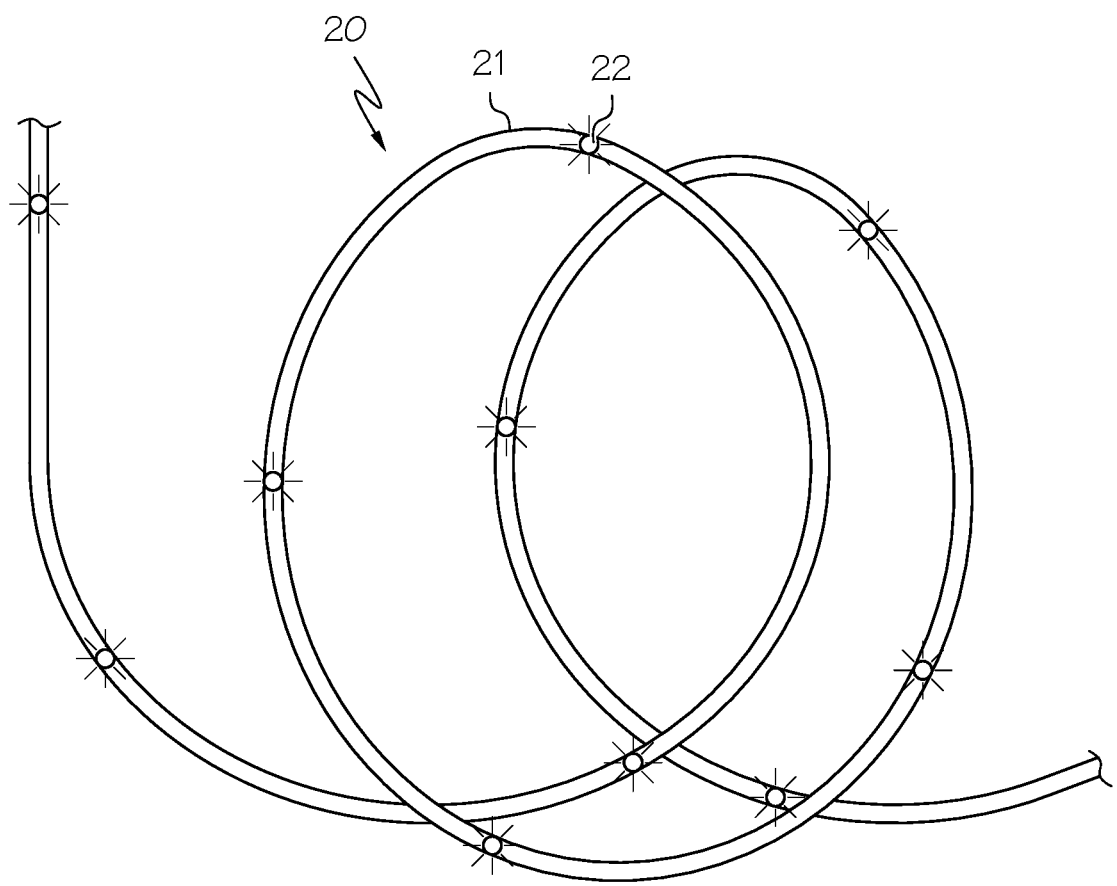
FIG. 3 depicts an illustrative illumination source, according to one or more embodiments shown and described herein.

Referring now to FIG. 2, exploded view of the control module 70 is depicted. The control module 70 includes a housing comprising a bottom portion 71 and a top portion 75. The bottom portion 71 and the top portion 75 of the housing couple together forming a watertight enclosure that houses the power source and electrical circuitry configured to power and control the operation of the illumination sources 20. The bottom portion 71 and the top portion 75 of the housing form a watertight housing through interlocking threads and optionally a sealing ring 72 positioned between the bottom portion 71 and the top portion 75 of the housing.

Furthermore, the top portion 75 of the housing includes an opening that is fitted with a pliable insert 76 that functions as a button that a user may depress to activate a switch 74A. Activating the switch 74A may turn on or off the illumination sources 20 and/or change the illuminating mode of the illumination sources 20.

The control module 70 further includes a battery holder 73 that is electrically coupled to the circuit board 74. The battery holder 73 may be configured to retain the power source. The power source may be a primary or secondary battery. For example, the power source may be one or more cylindrical cell batteries 73A, 73B, 73C as depicted in FIG. 13B (e.g., AAA or AA sized batteries). The secondary battery may be a lithium polymer or the like. The power source may have a capacity capable of generating 10 hours of run time. In some embodiments, the control module 70 may include a charging port (not show) for charging a secondary battery. The charging port may be electrically and mechanically coupled to the circuit board 74. The charging port may be a mini-USB, a micro-USB, or a USB-C type port. The charging port enables the power source to be charged from an external power source.

The switch 24 may be a push button whereby sequential operation of the push button causes the illumination sources 20 to output light at a corresponding power level, cycle through one or more colors, flash or strobe, or deactivate. For example, a first press of the button causes the illumination sources 20 to activate, a second press causes the illumination hold on a currently illuminated color of light, a third press may cause the light level to decrease, and a fourth press may cause the illumination sources 20 to deactivate. The illumination sources 20 may be configured to morph through a predefined sequence of colors or remain illuminated on one color. As used herein, the term morph refers to a gradual transition from one color or brightness to another. The illumination sources 20 include white LEDs and/or RGBW LEDs.

Other sequences of activation of the switch 74A may cause the illumination sources 20 to operate in a different way such as with respect to brightness, color, flash frequency, or the like. In another example, a first press of the button causes the illumination sources 20 to provide light in at a brightness level where the color of the light cycles through a number of different colors. A second press of the button causes the illumination sources 20 to hold illumination at the color that is provided when the button is pressed a second time. A third press of the button may cause the illumination sources 23 to deactivate (e.g., 0% power level). In yet other embodiments, pressing the button (e.g., activating the switch 74A) a predetermined number of time causes the light to cycle from a steady state to a flashing or strobing state. It should be understood that the order of button presses described here are not limited to only these examples. Other combinations and functions may be implemented. Furthermore, in some embodiments, depressing and holding the button for a predefined period of time causes the illumination devices 20 to change operating modes, such as flashing to steady, one to off, a first color to a second color, or the like.

Modes of illumination may include high brightness, medium brightness, low brightness, and/or a flashing mode. The brightness may change my change the power delivered to the light illuminating devices. For example, the light emitting devices may provide 5 lumens, 10 lumens, 15 lumens, 25 lumens, 50 lumens, 75 lumens, or any level between 5 and 100 lumens. Each brightness mode may be configured to provide a different lumen level. Modes of illumination may also include changing the color of the light emitted. In some embodiments, the one or more illumination sources 23 may be configured cycle or morph from a first color to a second color.

The control module 70 depicted in the FIG. 2 has a generally cylindrical, but embodiments are not limited to the size and shape of the control module 70 as depicted.

FIG. 2 depicts an illustrative example of a length of an illumination source 20 such as a rope light that is activated. The illumination source 20 may be a paracord or other rope light material having multiple lights 22 such as LEDs or other illumination devices woven into or enclosed within the length 21 of the illumination source 20. In some embodiments, one or more strand of illuminating optical fiber may be woven into or embedded with the core of the length 21 of rope material. Wires may connect each of the multiple lights 22 to a power source within the control module 70 of the illumination device 10. The illumination source 20 is flexible and may be made of a durable material. In some embodiments, the illumination source 20 may be washable. The illumination source 20 may be weather and/or water resistant. Each of the multiple lights 22 may be spaced apart with equal or near equal spacing. For example, lights 22 may be spaced every 5 cm, 10 cm, 15 cm, 20 cm, 25 cm, 30 cm or anywhere between 5 cm and 30 cm apart. The length 21 of the illumination source 20 may have a total length of about 5 ft. to about 50 ft., or about 5 ft., 10 ft., 15 ft., 20 ft., 25 ft., 30 ft., 35 ft., 40 ft., 45 ft., or 50 ft.

Figure 4:
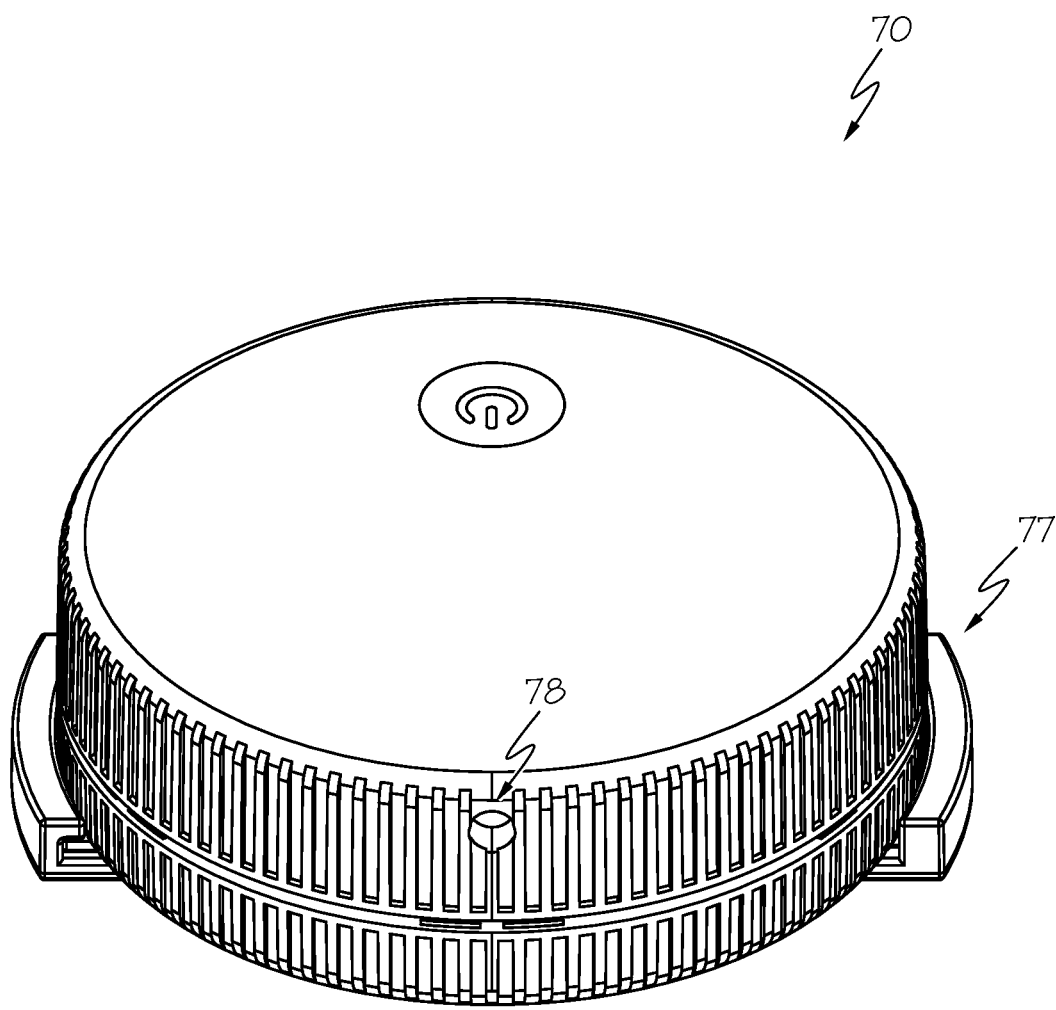
FIG. 4 depicts an assembled view of the control module of FIG. 2 and a mounting bracket for the same, according to one or more embodiments shown and described herein.

Referring to FIG. 4 depicts an assembled view of the control module 70 depicted in FIG. 2. In embodiments, the control module 70 includes a control module mounting bracket 77. The control module mounting bracket 77 may be attached to the deck of the kayak 5 by way of fasteners and/or adhesive. The control module 70 may be then be mechanically attached to the control module mounting bracket 77 such that it can be selectively connected and disconnected. The control module 70 also includes a port 78 for permitting wires 60S and 60P from the control module 70 to exit the interior of the control module 70 and connect to the illumination sources 20. The port 78 may include a watertight seal around the one or more wires 60S and 60P extending from the control module connecting the electrical circuit to the one or more illumination sources 20.

Figure 5:
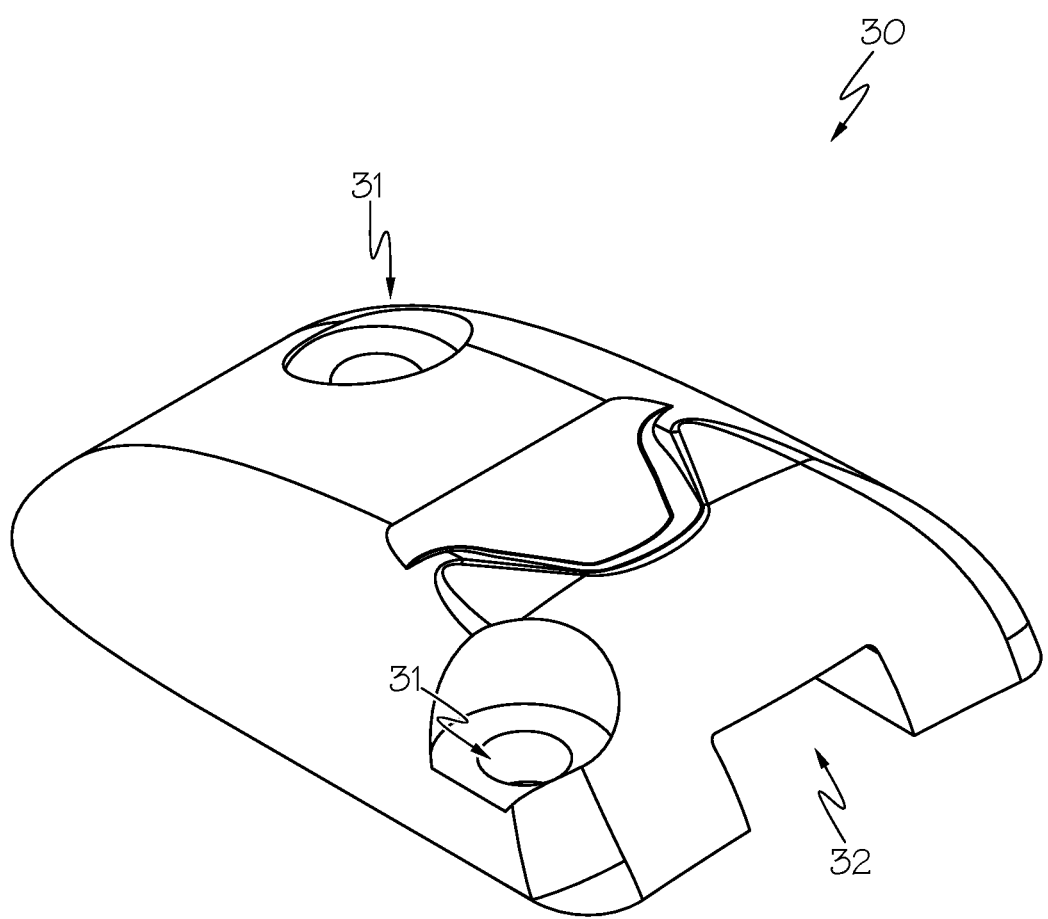
FIG. 5 depicts illustrative drawing of a first mounting brackets, according to one or more embodiments shown and described herein.
Figure 6:
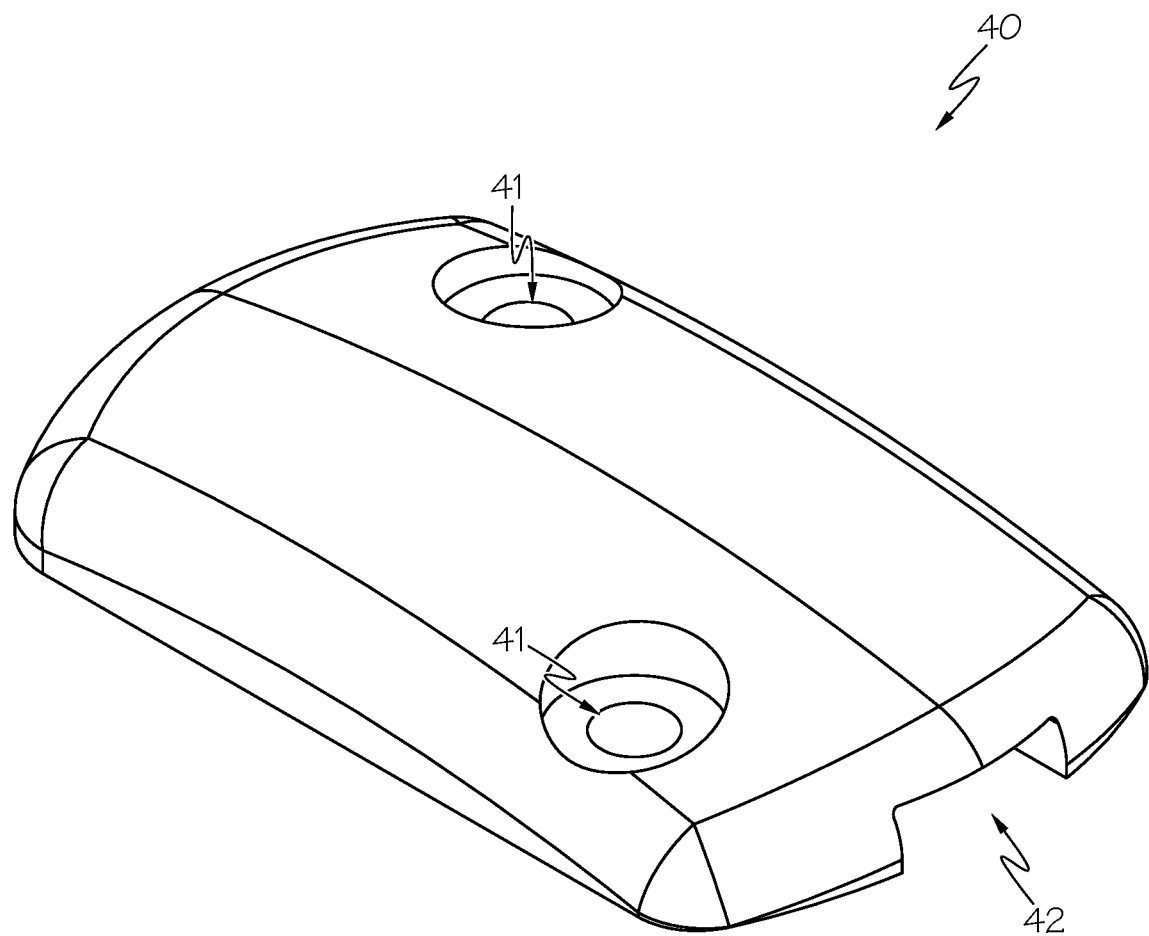
FIG. 6 depicts illustrative drawing of a second mounting brackets, according to one or more embodiments shown and described herein.
Figure 7:
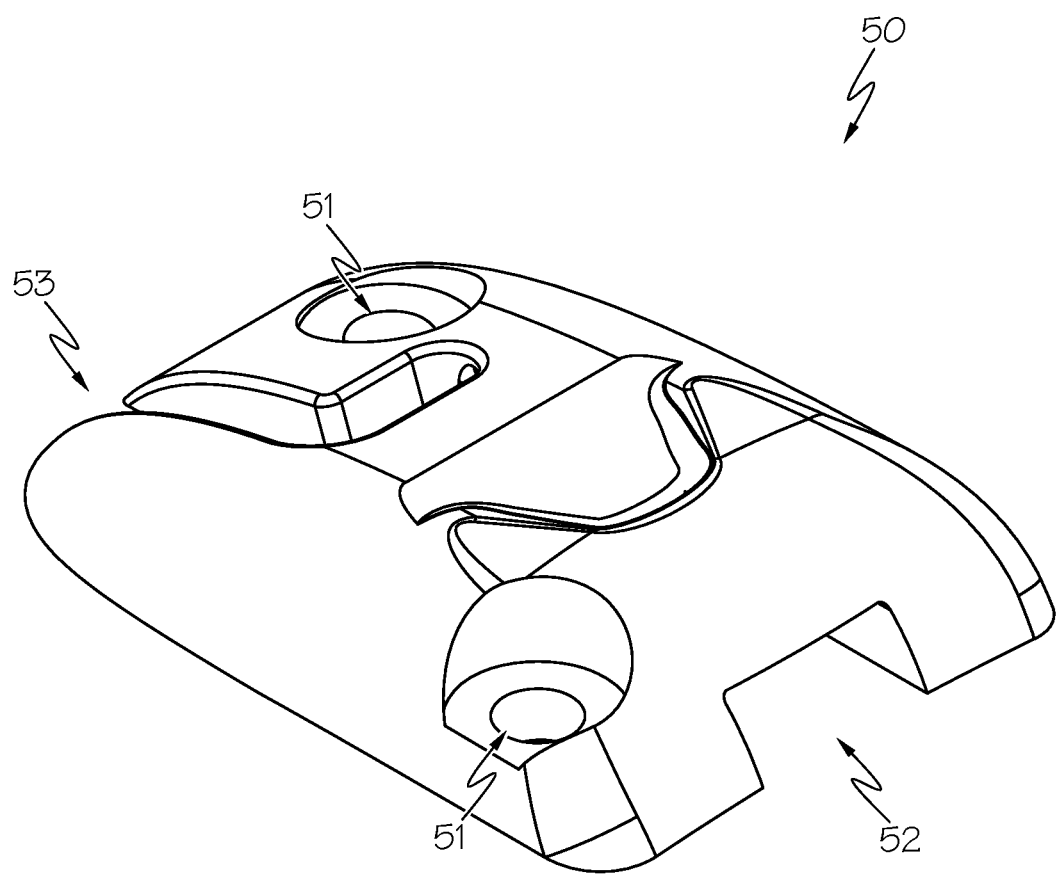
FIG. 7 depicts illustrative drawing of a third mounting brackets, according to one or more embodiments shown and described herein.
Figure 11:
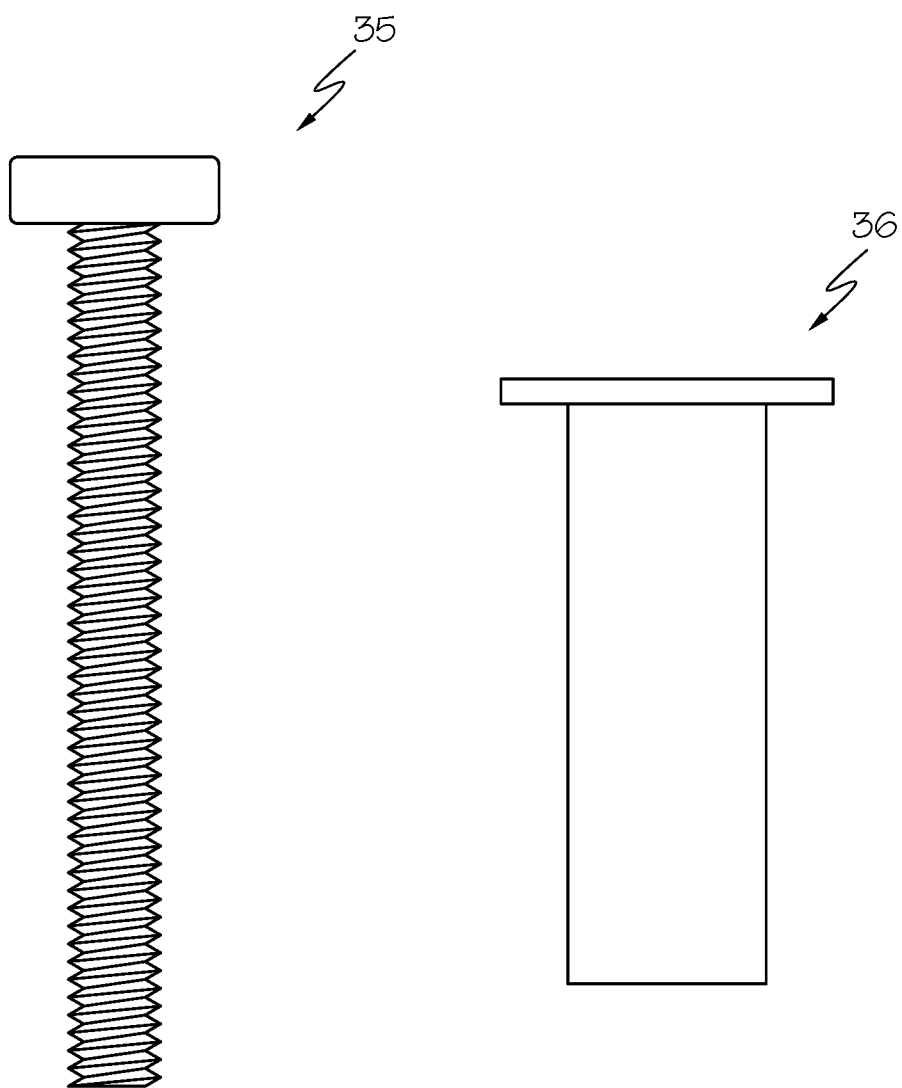
FIG. 11 depicts an illustrative fastener and nut, according to one or more embodiments shown and described herein.

Turning to FIGS. 5-7, illustrative drawings of the mounting brackets 30, 40, and 50 are depicted. In particular, FIG. 5 depicts a first mounting bracket 30 (e.g., also referred to herein as a terminal bracket) for connecting a first end of the illumination source 20 to the hull of the kayak 5. The first mounting bracket 30 includes one or more through holes 31 for attaching the first mounting bracket 30 to an object such as a kayak 5 with the fasteners such as one depicted in FIG. 11. Referring briefly to the fasteners depicted in FIG. 11, the fastener may include a screw-type fastener 35 such as a machine screw and a nut 36 such as a nylon nut that can be fitted through the hull of the kayak 5 and the mounting brackets 30, 40, and 50 thereby attaching the mounting brackets 30, 40, and 50 to the hull of the kayak 5. The nut 36 may include a flange that creates a seal with the hull of the kayak 5 so that coupling the mounting brackets 30, 40, and 50 are attached with a watertight seal. The nut 36 may be fitted into a hole in the surface of the kayak 5. The nut 36 may secured within the hole of the kayak by an adhesive and may further be sealed with a caulk or other sealing material or putty to form a watertight seal.

Referring back to FIG. 5, the first mounting bracket 30 includes a channel 32 configured to receive and retain the first end of the illumination source 20. Turning to FIG. 6, a second mounting bracket 40 (e.g., as referred to herein as an intermediate bracket) is depicted. Similar to the first mounting bracket 30, the second mounting bracket includes one or more holes 41. The second mounting bracket 40 also includes a channel 42. The channel 42, unlike the first mounting bracket 30, extends along the entire length of the second mounting bracket 40 so that a portion of the illumination source 20 may extend through under the second mounting bracket 40 and between the hull of the kayak 5 and the second mounting bracket 40.

Referring now to FIG. 7, a third mounting bracket 50 (e.g., as referred to herein as an initiating bracket) is depicted. The third mounting bracket 50 includes one or more through holes 51 for attaching the third mounting bracket 50 to an object such as a kayak with the fasteners such as one depicted in FIG. 11. The third mounting bracket 50 includes a first channel 52 configured to receive and retain the second end of the illumination source 20. Additionally, the third mounting bracket 50 includes a second channel 53 generally opposite the first channel 52. The second channel 53 is configured to retain a wire 60S and 60P connecting the control module 70 to the illumination sources 20. Moreover, the wires 60S and 60P may be connected to the illumination sources 20 via connected or may be soldered to the illumination sources 20.

Figure 8:
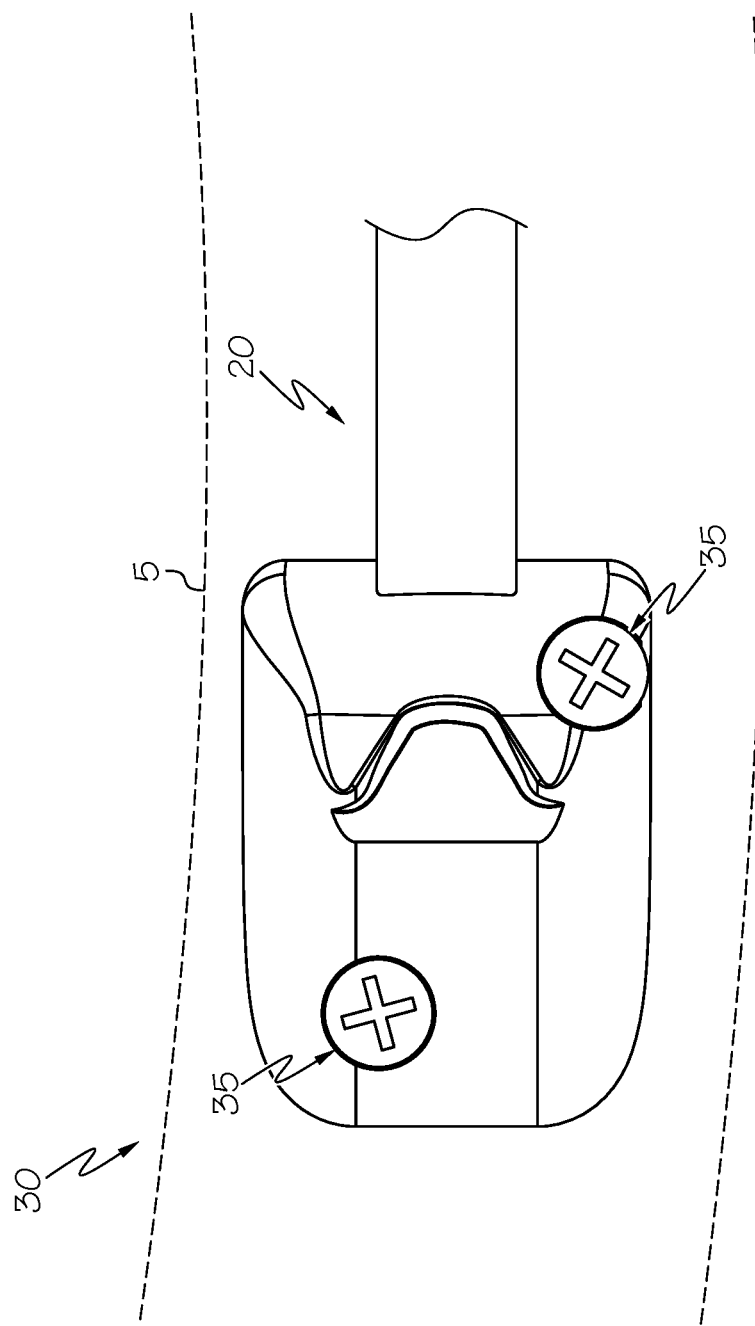
FIG. 8 depicts an illustrative view of the first mounting bracket coupling the illumination source to the hull of a kayak, according to one or more embodiments shown and described herein.
Figure 9:
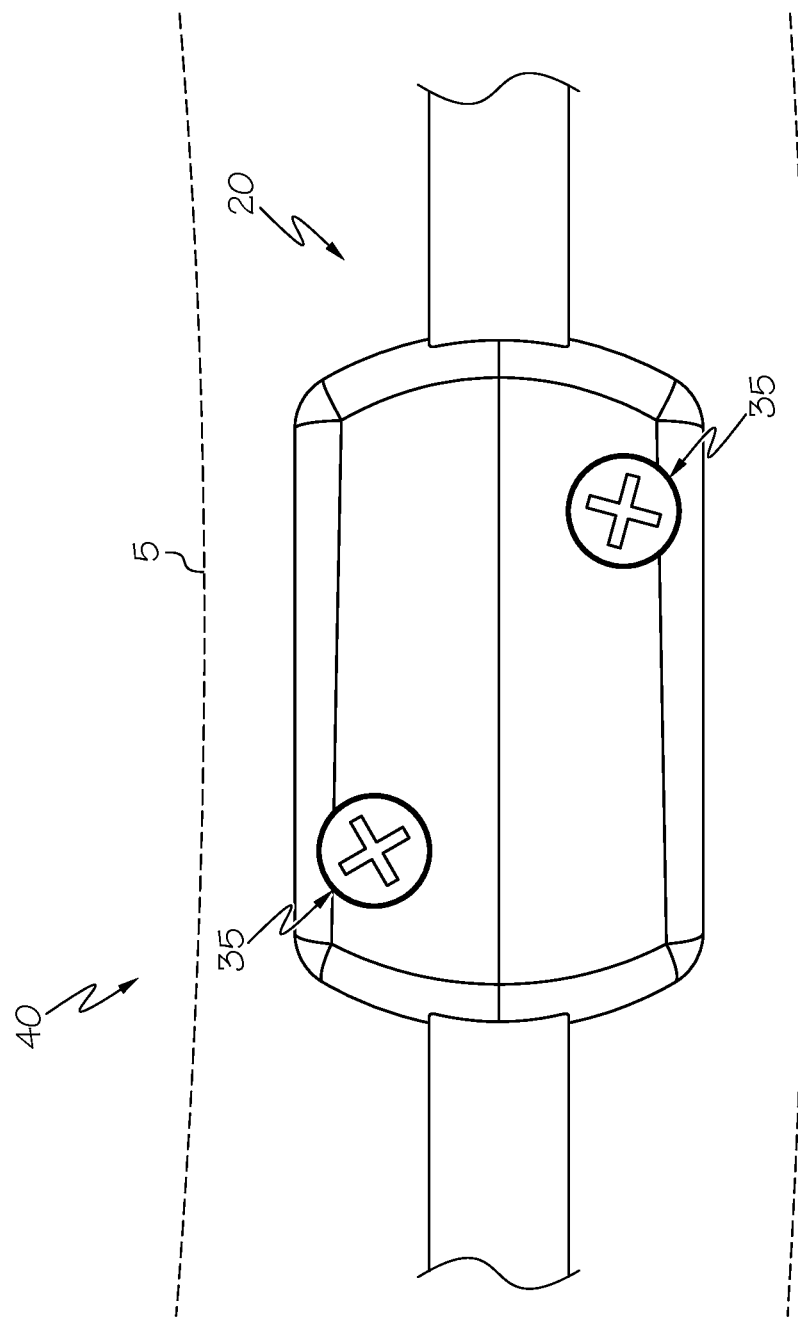
FIG. 9 depicts an illustrative view of the second mounting bracket coupling the illumination source to the hull of a kayak, according to one or more embodiments shown and described herein.
Figure 10:
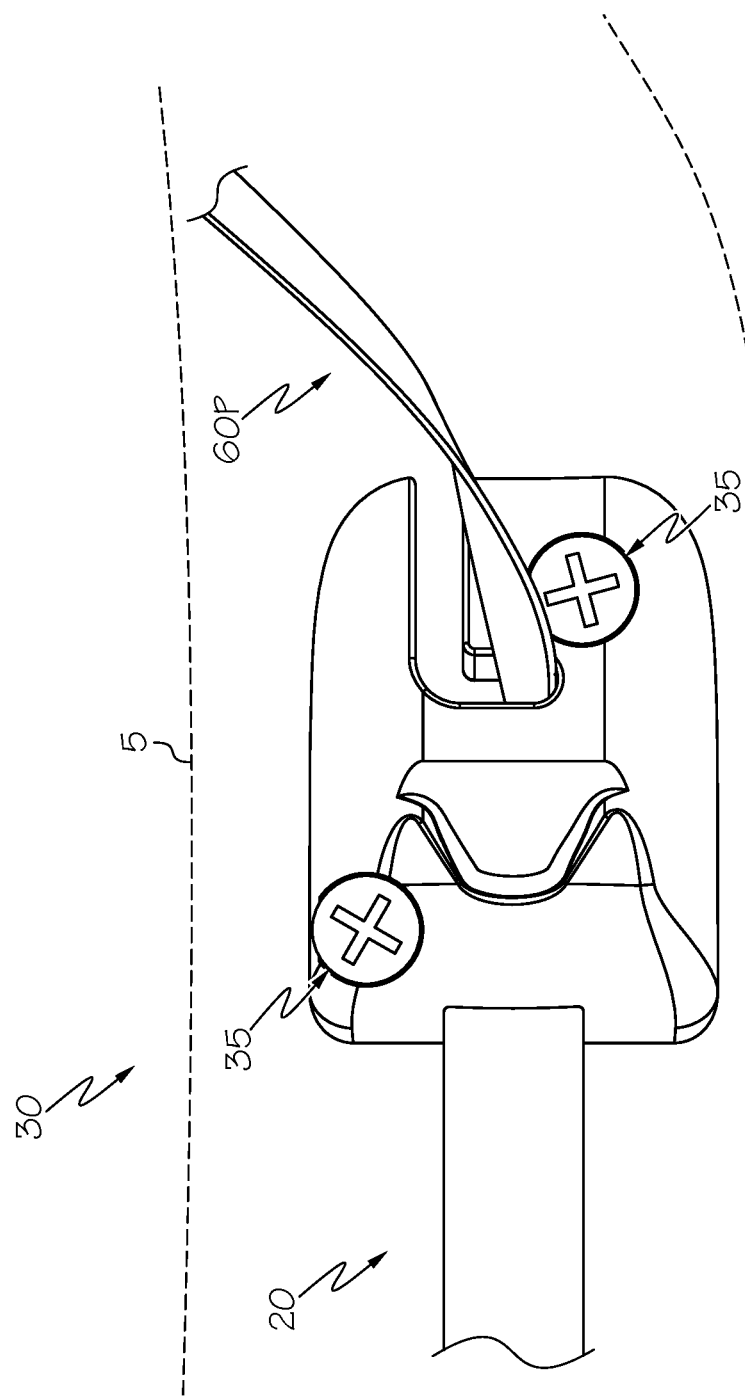
FIG. 10 depicts an illustrative view of the third mounting bracket coupling the illumination source to the hull of a kayak, according to one or more embodiments shown and described herein.

Turning the FIGS. 8-10, illustrative examples of the mounting brackets 30, 40, and 50 coupling the illumination sources 20 to the hull of the kayak 5 are depicted. In FIG. 8, a terminal bracket (e.g., a first mounting bracket 30) receives an end portion of the illumination source 20 and retains it therein so that the illumination source 20 may be coupled to the surface of the object such as the kayak 5 depicted in FIG. 8. In FIG. 9, an intermediate bracket (e.g., a second mounting bracket 40) receives a contiguous portion of length 21 of the illumination source 20 and retains it within a channel 42 of the intermediate bracket. The channel 42 may include an adhesive material such as tape or glue that further secures the illumination source 20 within the channel of the intermediate bracket. The intermediate bracket couples the illumination source 20 to the surface of the object such as the kayak 5 depicted in FIG. 9. In FIG. 10, an initiating bracket (e.g., a third mounting bracket 50) receives a portion of the illumination source 20 that connects to the wire 60S or 60P. This portion is retained within the initiating bracket so that the illumination source 20 may be coupled to the surface of the object such as the kayak 5 depicted in FIG. 10.

Figure 12:
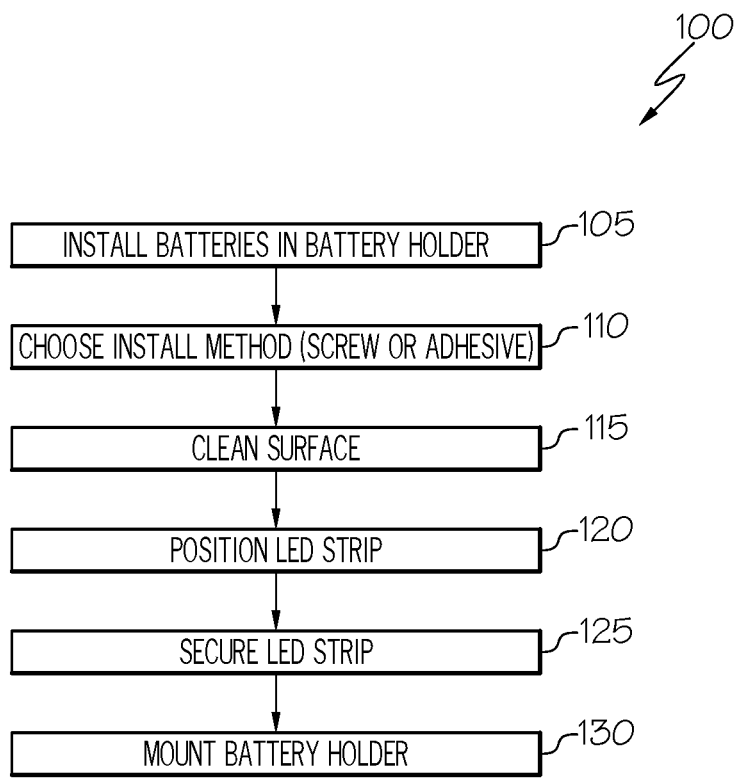
FIG. 12 depicts an example method of installation, according to one or more embodiments shown and described herein.

Referring now to FIG. 12, an example method 100 for illuminating an object such as a kayak with an illumination device 10 is depicted. The method 100 will be described with reference to the figures discussed herein. At step 105, the top portion 75 of the control module 70 is separated from the bottom portion 71 of the control module 70 so that one or more batteries 73A, 73B, 73C as depicted in FIG. 13B may be installed. FIG. 13B depicts an illustrative power source installation process. The bottom portion 71 may rotate relative to the top portion to OPEN or CLOSE the control module 70. The top portion 75 may include a battery holder 73 that is configured to receive one or more batteries 73A, 73B, 73C.

At step 110, an installer determines whether to install the illumination device 20 using adhesive, screw type fasteners, or a combination thereof. At step 115, the surface of the object may be cleaned in order to prepare it for installation. In some instances, cleaning the surface improves adhesion of the adhesive materials. At step 120, the one or more illumination sources are positioned at desired locations on the surface of the object. For example, adhesive tape may be used to provide a temporary alignment of the one or more illumination sources 20. At step 125, the one or more illumination sources 20 are secured to the surface of the object. For example, step 125 may include coupling a first illumination source, about a portion of the length where a first wire from the control module connects to the first illumination source, to the surface of the object with an initiating bracket of the one or more mounting brackets. Step 125 may further include coupling a first end of the length of the first illumination source to the surface of the object with a terminal bracket of the one or more mounting brackets. Step 125 may further include coupling a contiguous portion of the length of the first illumination source to the surface of the object with one or more intermediate brackets of the one or more mounting brackets. Step 125 may be repeated for each of the one or more illumination sources 20 included with the illumination device 10.

At step 130, the control module 70 which includes the power source and electrical circuit for powering and controlling the one or more illumination sources 20 is connected to the surface of the object. Step 130 may first include coupling a control module mounting bracket 77 to a surface of the object. Once the control module mounting bracket 77 is attached, the control module 70 can be attached to the control module mounting bracket 77. The aforementioned installation process may be performed in a different order and may include other various steps.

Figure 13A:
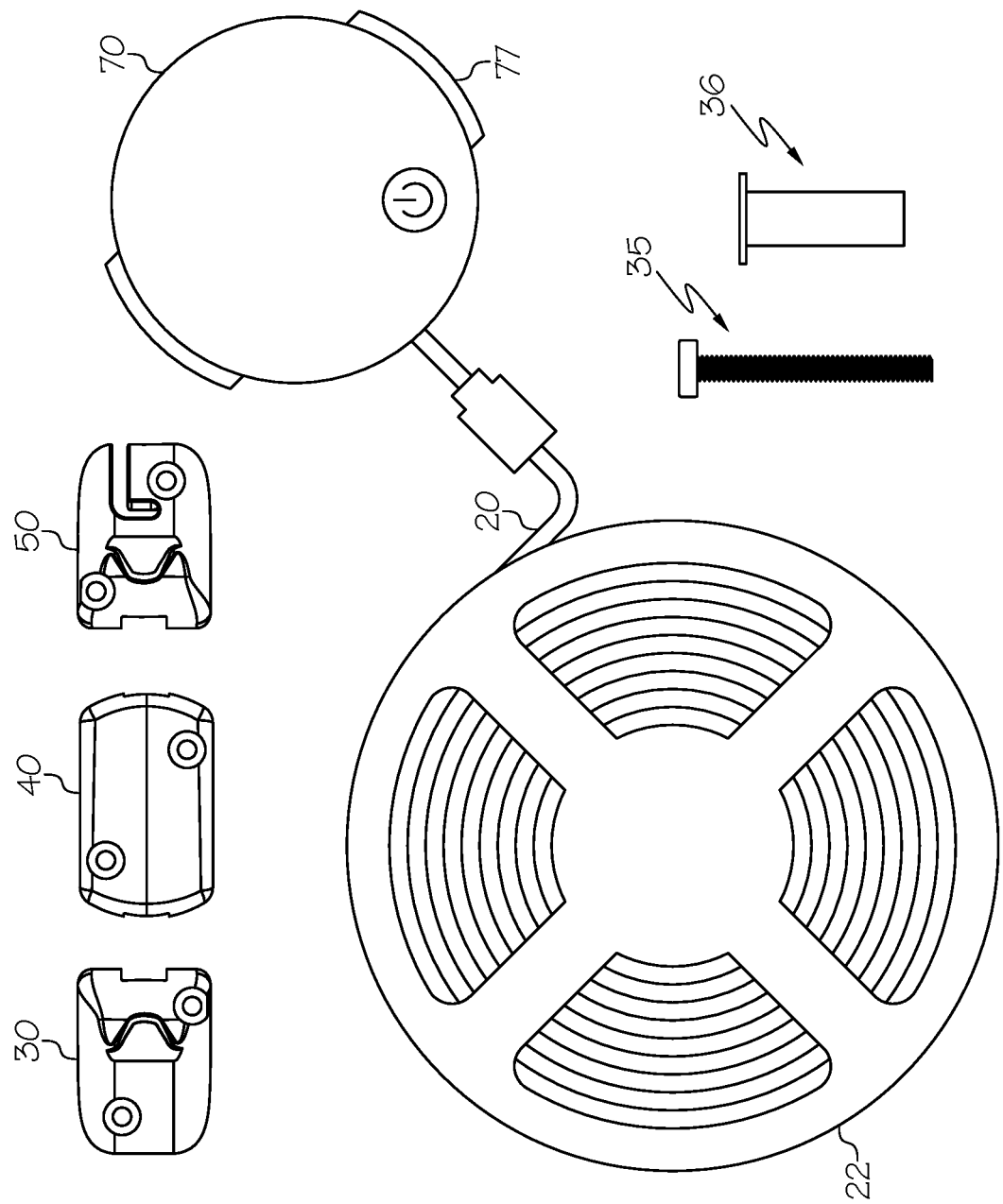
FIG. 13A depicts an illustrative kayak illumination device kit, according to one or more embodiments shown and described herein.
Figure 13B:
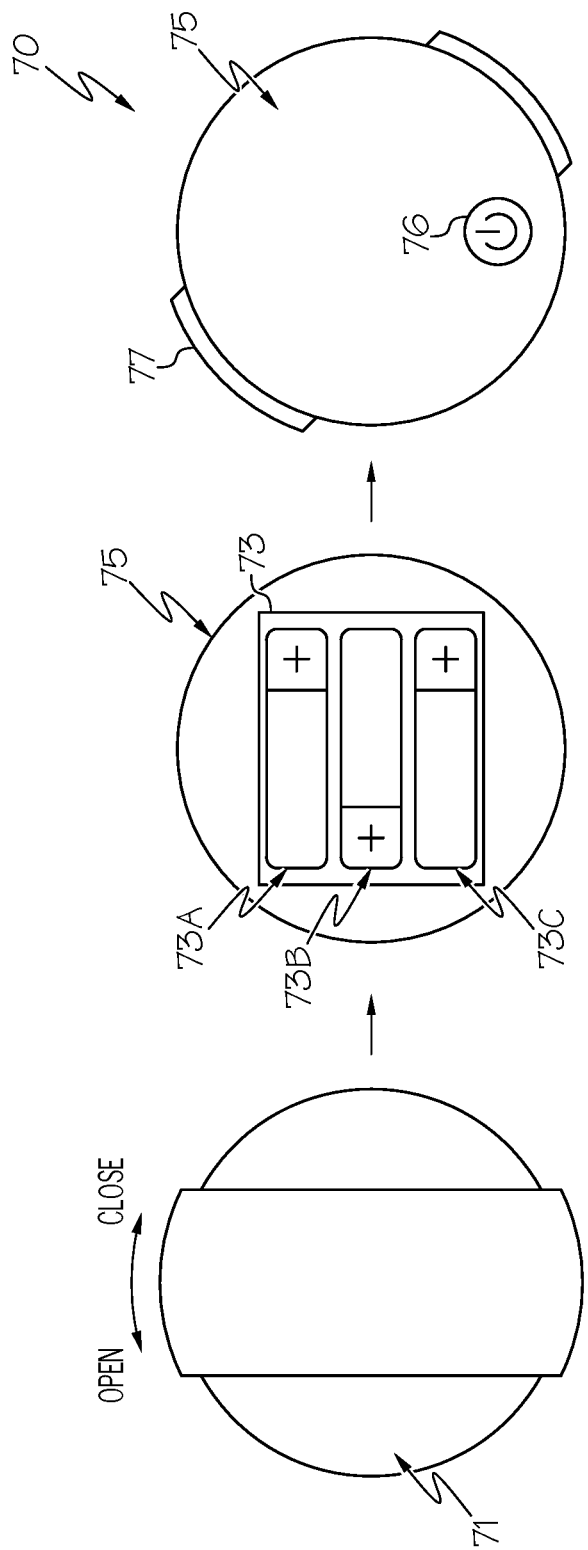
FIG. 13B depicts an illustrative power source installation process, according to one or more embodiments shown and described herein.
Figure 13C:
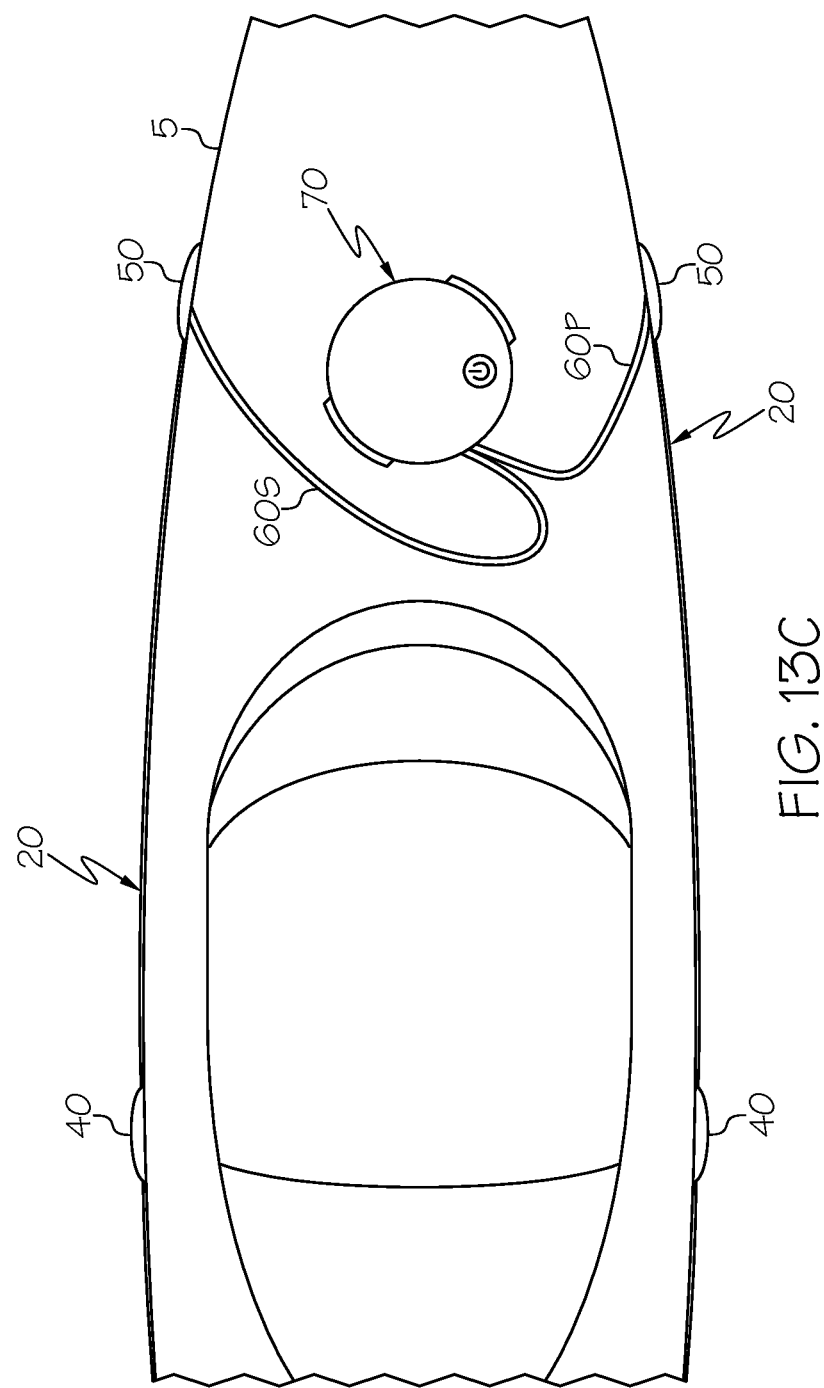
FIG. 13C depicts a top down view of the kayak illumination device installed on a kayak, according to one or more embodiments shown and described herein.

Referring FIGS. 13A-13C more specifically, FIG. 13A depicts an illustrative kayak illumination device kit. The kit may include one or more mounting brackets 30, 40, 50, a control module 70 and control module mounting bracket 77, a spool 22 for shipping and retaining the one or more illumination sources 20 and a plurality of fasteners 35 and corresponding nuts 36 (e.g., nylon nuts). As illustrated in FIG. 13A, the one or more illumination sources 20 may be coupled to the control module 70 via one or more wires 60S, 60P. The one or more wires 60S, 60P may include a selectively removable type connector or a fixed type connector component for electrically and mechanically connecting to the one or more illumination sources 20. FIG. 13B, as discussed above, depicts an illustrative battery installation diagram. Finally, FIG. 13C depicts a top down view of the kayak illumination device 10 installed on the starboard and port side of a hull of a kayak 5.

Implementation examples are described in the following numbered clauses:

Clause 1: An illumination device comprising one or more illumination sources each comprising a length of material and one or more lights configured to illuminated the length of the material; one or more mounting brackets configured to receive a portion of the length of the one or more illumination sources and couple the received portion of the one or more illumination sources to a surface of an object; a control module comprising a power source and an electrical circuit, wherein the electrical circuit is configured to electrically couple the power source to the one or more illumination sources based on operation of a switch in the electrical circuit; and a control module mounting bracket configured to selectively secure the control module to the surface of the object.

Clause 2: The illumination device of Clause 1, wherein: the one or more illumination sources comprise a first illumination source comprising a first length of material, the first illumination source electrically connects to the electrical circuit via a first wire extending from the control module, the one or more mounting brackets comprise a initiating bracket and a terminal bracket, the initiating bracket receives a portion of the first length where the first wire connects to the first illumination source, the initiating bracket couples the first illumination source to the surface of the object at the portion of the first length where the first wire connects to the first illumination source, and the terminal bracket receives a first end portion of the first length and couples the first illumination source to the surface of the object.

Clause 3: The illumination device of Clause 2, wherein: the one or more mounting brackets further comprise an intermediate bracket, the intermediate bracket receives a contiguous portion of the first length of the first illumination source between the portion of the first length where the first wire connects to the first illumination source and the first end portion of the first length, and the intermediate bracket couples the first illumination source to the surface of the object at the contiguous portion.

Clause 4: The illumination device of Clause 1, wherein: the one or more illumination sources includes: a first illumination source comprising a first length of material and a second illumination source comprising a second length of material, the first illumination source electrically connects to the electrical circuit via a first wire extending from the control module, and the second illumination source electrically connects to the electrical circuit via a second wire extending from the control module.

Clause 5: The illumination device of Clause 4, wherein: the one or more mounting brackets comprise a first initiating bracket and a first terminal bracket, the first initiating bracket receives a portion of the first length where the first wire connects to the first illumination source, the first initiating bracket couples the first illumination source to the surface of the object at the portion of the first length where the first wire connects to the first illumination source, the first terminal bracket receives a first end portion of the first length, and the first terminal bracket couples the first illumination source to the surface of the object.

Clause 6: The illumination device of Clause 5, wherein: the one or more mounting brackets comprise a second initiating bracket and a second terminal bracket, the second initiating bracket receives a portion of the second length where the second wire connects to the second illumination source, the second initiating bracket couples the second illumination source to the surface of the object, and the second terminal bracket receives a second end portion of the second length and couples the second illumination source to the surface of the object.

Clause 7: The illumination device of Clause 6, wherein: the one or more mounting brackets further comprise a first intermediate bracket and a second intermediate bracket, the first intermediate bracket receives a first contiguous portion of the first length of the first illumination source between the portion of the first length where the first wire connects to the first illumination source and the first end portion of the first length, the first intermediate bracket couples the first illumination source to the surface of the object at the first contiguous portion, the second intermediate bracket receives a second contiguous portion of the second length of the second illumination source between the portion of the second length where the second wire connects to the second illumination source and the second end portion of the second length, and the second intermediate bracket couples the second illumination source to the surface of the object at the second contiguous portion.

Clause 8: The illumination device of any one of Clauses 1-7, wherein the one or more mounting brackets comprises one or more holes for receiving a fastener there through and coupling the one or more mounting brackets to the surface of the object.

Clause 9: The illumination device of any one of Clauses 1-8, further comprising an adhesive material, wherein the adhesive material is configured to couple the one or more mounting brackets to the surface of the object.

Clause 10: The illumination device of any one of Clauses 1-9, wherein: a first illumination source of the one or more illumination sources comprises a plurality of lights positioned along the length of the material of the first illumination source, each of the plurality of lights is electrically coupled to the power source, and the plurality of lights and the length of the material are encapsulated in a light permeable, waterproof tube.

Clause 11: The illumination device of any one of Clauses 1-10, wherein one of the one or more illumination sources is an illuminating optical fiber configured to diffuse light from the one or more light sources along the length of the illuminating optical fiber.

Clause 12: The illumination device of any one of Clauses 1-11, wherein the object is at least one of a kayak, a canoe, a boat, a golf cart, or an all-terrain vehicle.

Clause 13: The illumination device of any one of Clauses 1-12, wherein the control module comprises a top portion and a bottom portion coupled to the top portion, wherein when the top portion and the bottom portion are coupled together, a watertight enclosure is formed within the control module.

Clause 14: The illumination device of Clause 13, further comprising a sealing ring positioned between the top portion and the bottom portion.

Clause 15: The illumination device of Clause 13, further comprising a pliable insert in the top portion of the control module, wherein the pliable insert enables waterproof interaction with the switch disposed within the control module.

Clause 16: The illumination device of any one of Clauses 1-15, wherein the power source comprises one or more primary batteries disposed within a battery holder within the control module.

Clause 17: The illumination device of any one of Clauses 1-16, wherein the control module comprises one or more ports extending from an outside surface of the control module to an internal portion of the control module, the one or more ports are configured with a watertight seal around one or more wires extending from the control module connecting the electrical circuit to the one or more illumination sources.

Clause 18: A method for illuminating an object with an illumination device comprising a first illumination source comprising a length of material and one or more lights configured to illuminated the length of the material, one or more mounting brackets, a control module comprising a power source and an electrical circuit, wherein the electrical circuit is configured to electrically couple the power source to the one or more illumination sources based on operation of a switch in the electrical circuit, and a control module mounting bracket, the method comprising: coupling the control module mounting bracket to a surface of the object; attaching the control module to the control module mounting bracket; coupling the first illumination source, about a portion of the length where a first wire from the control module connects to the first illumination source, to the surface of the object with an initiating bracket of the one or more mounting brackets; and coupling a first end of the length of the first illumination source to the surface of the object with a terminal bracket of the one or more mounting brackets.

Clause 19: The method of Clause 18, further comprising coupling a contiguous portion of the length of the first illumination source to the surface of the object with one or more intermediate brackets of the one or more mounting brackets.

Clause 20. The method of any one of Clauses 18-19, wherein the object is at least one of a kayak, a canoe, a boat, a golf cart, or an all-terrain vehicle.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

What is claimed is:

1. A method for illuminating an object with an illumination device comprising a first illumination source comprising a length of material and one or more lights configured to illuminate the length of the material, one or more mounting brackets, a control module comprising a power source and an electrical circuit, wherein the electrical circuit is configured to electrically couple the power source to the one or more illumination sources based on operation of a switch in the electrical circuit, and a control module mounting bracket, the method comprising:
coupling the control module mounting bracket to a surface of the object;
attaching the control module to the control module mounting bracket;
coupling the first illumination source, about a portion of the length where a first wire from the control module connects to the first illumination source, to the surface of the object with an initiating bracket of the one or more mounting brackets; and
coupling a first end of the length of the first illumination source to the surface of the object with a terminal bracket of the one or more mounting brackets.

2. The method of claim 1, further comprising coupling a contiguous portion of the length of the first illumination source to the surface of the object with one or more intermediate brackets of the one or more mounting brackets.

3. The method of claim 1, wherein the object is at least one of a kayak, a canoe, a boat, a golf cart, or an all-terrain vehicle.

\* \* \* \* \*